US009167194B2

(12) United States Patent
D'Alessio et al.

(10) Patent No.: US 9,167,194 B2
(45) Date of Patent: Oct. 20, 2015

(54) METHOD FOR GENERATING A UNIQUE SERVICE SET IDENTIFIER ON A WIRELESS PROJECTOR

(75) Inventors: Samuel D'Alessio, Round Rock, TX (US); Thanh Pham, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 137 days.

(21) Appl. No.: 12/758,222

(22) Filed: Apr. 12, 2010

(65) Prior Publication Data

US 2011/0249198 A1 Oct. 13, 2011

(51) Int. Cl.
| | |
|---|---|
| H04N 9/31 | (2006.01) |
| H04N 7/173 | (2011.01) |
| G06F 15/177 | (2006.01) |
| H04N 5/74 | (2006.01) |
| H04W 8/00 | (2009.01) |

(52) U.S. Cl.
CPC ......... *H04N 5/74* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 6,909,406 B2 | 6/2005 | Wilburn et al. | |
| 7,367,514 B2 | 5/2008 | Soule, III et al. | |
| 7,486,946 B2 | 2/2009 | Shinozaki | |
| 7,558,289 B1 | 7/2009 | Bidichandani et al. | |
| 7,663,569 B2 * | 2/2010 | Ono | 345/2.3 |
| 8,041,035 B2 * | 10/2011 | Miller | 380/255 |
| 2003/0074230 A1 * | 4/2003 | Merkin et al. | 705/4 |
| 2005/0110953 A1 * | 5/2005 | Castaldi et al. | 353/30 |
| 2005/0210390 A1 * | 9/2005 | Ono | 715/730 |
| 2006/0238722 A1 * | 10/2006 | Jayaram et al. | 353/85 |
| 2006/0256144 A1 | 11/2006 | Chung | |
| 2007/0177115 A1 | 8/2007 | Yin et al. | |
| 2007/0273848 A1 | 11/2007 | Fan et al. | |
| 2009/0185147 A1 | 7/2009 | Alaganchetty et al. | |
| 2009/0232082 A1 | 9/2009 | Bidichandani et al. | |
| 2009/0252057 A1 * | 10/2009 | Flemming et al. | 370/254 |
| 2010/0103272 A1 * | 4/2010 | Yagi | 348/192 |
| 2010/0232357 A1 * | 9/2010 | Kubota et al. | 370/328 |
| 2010/0296654 A1 * | 11/2010 | Wilson et al. | 380/270 |

FOREIGN PATENT DOCUMENTS

JP 2010033523 A * 2/2010

OTHER PUBLICATIONS

Data Projector XJ-A135/XJ-A145/XJ-A235/XJ-A245—Data Projector Wireless Function Guide, Mar. 1, 2010, p. 16.*
English Translation of JP 2010033523 A (Feb. 2010—Japanese Patent Application No. 2008-213305).*

(Continued)

*Primary Examiner* — Idriss N Alrobaye
*Assistant Examiner* — Dayton Lewis-Taylor
(74) *Attorney, Agent, or Firm* — Larson Newman, LLP

(57) ABSTRACT

A projector includes a network interface card, a basic input output system, and a service set identifier module. The network interface card is configured to communicate with a computer. The basic input output system is in communication with the network interface card, and is configured to store a model number and identification data for the projector. The service set identifier module is in communication with the basic input output system, and is configured to retrieve the model number and the identification data, and to utilize the model number and the identification data to create a unique service set identifier for the projector.

19 Claims, 5 Drawing Sheets

(56) References Cited

OTHER PUBLICATIONS

"ProxNet: Secure DynamicWireless Connection by Proximity Sensing," Rekimoto et al., Interaction Laboratory, Sony Computer Science Laboratories, Inc., Pervasive 2004, LNCS 3001, pp. 213-218, Springer-Verlag Berlin Heidelberg 2004, http://www.csl.sony.co.jp/person/rekimoto.html.

"LiteShow II Project the Big Picture—untethered," LiteShow II InFocus Projector LiteShow II Accessory for Projector, http://www.infocus.com/Accessories/Wireless/LiteShowII.aspx, pp. 1-2, 2010.

\* cited by examiner

| | |
|---|---|
| Model Name | 4610X-M0R002 |
| Input Source | Wireless / Network    1024X768 60 Hz |
| Operating Hour | 25 hr |
| Lamp Voltage | 75 V |
| eCode | T00F00L00 |
| PPID | CN-0U812M-S0081-950-0027 |
| IP Address | 192.168.100.10 |
| SSID | 4610X-ABC104 |
| Exit Menu | |

*FIG. 2*

METHOD FOR GENERATING A UNIQUE SERVICE SET IDENTIFIER ON A WIRELESS PROJECTOR

FIELD OF THE DISCLOSURE

This disclosure relates generally to information handling systems, and more particularly relates to a method for generating a unique service set identifier on a wireless projector.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Presentations are often given using a projector to project an image from an information handling system to a screen or wall in a size large enough for the audience to view. A computer can communicate with the projector to output images associated with a display screen of the computer. The communication between the computer and the projector can be through a wired or wireless connection controlled by software installed on the computer. If the communication is through a wireless connection, the user of the computer can be presented with a list, such as a list of service set identifiers (SSID), of projectors that are within the communication range of the computer. The user can then select the desired projector from the list to initiate communication between the computer and the projector.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 is an exemplary projector information menu.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
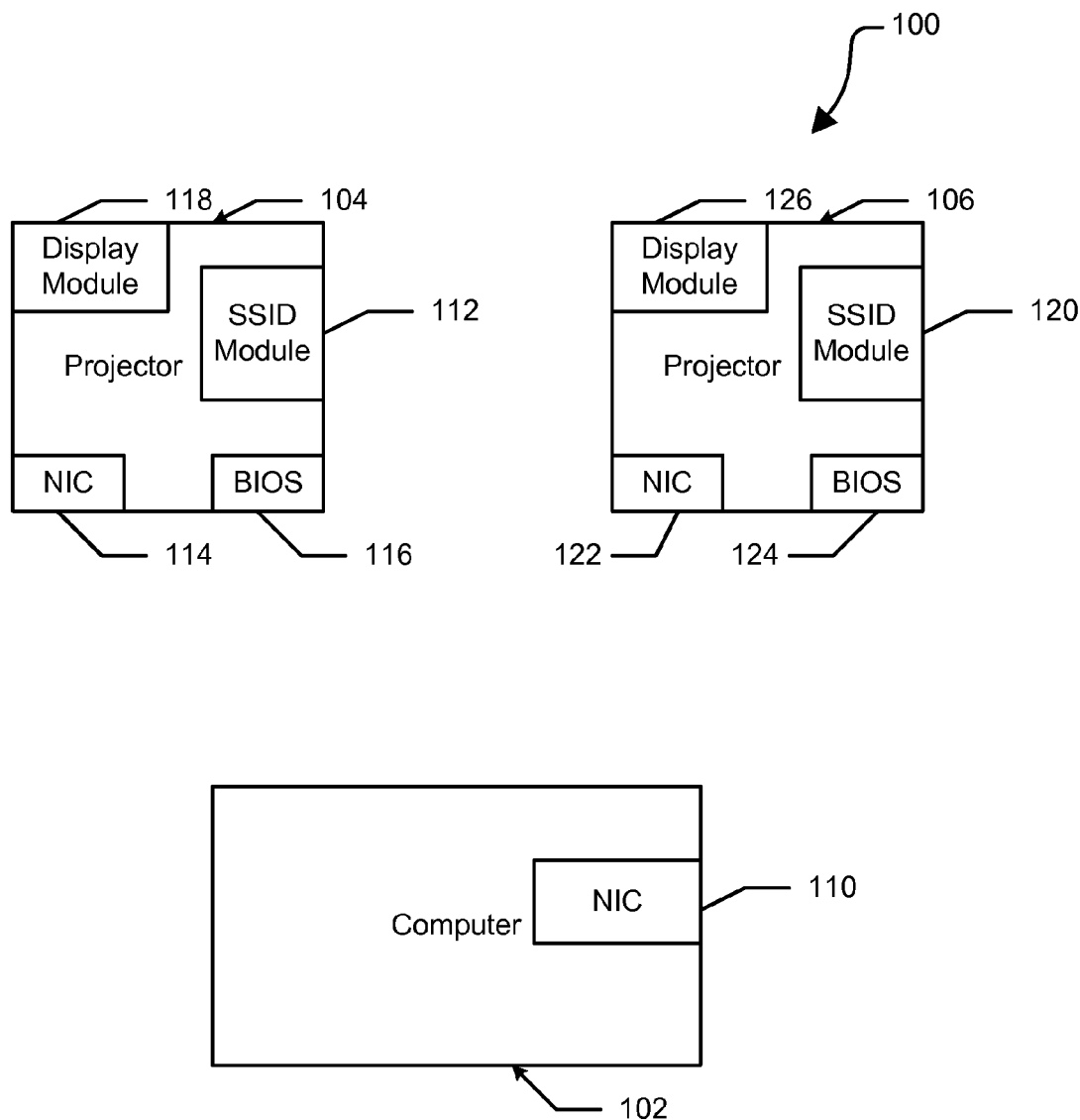
FIG. 1 is a block diagram of a projector system.

FIG. 1 shows a projector system 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The projector system 100 includes a computer 102 and projectors 104 and 106. The computer 102 includes a network interface card (NIC) 110 to communicate with each of the projectors 104 and 106. The projector 104 includes a service set identifier (SSID) module 112, a NIC 114, a basic input/output system (BIOS) 116, and a display module 118. The projector 106 includes an SSID module 120, a NIC 122, a BIOS 124, and a display module 126.

The NICs 110, 114 and 122 are preferably wireless NICs, such that the computer 102 can wirelessly communicate with the projectors 104 and 106. The computer 102 can utilize an IEEE 802.11 wireless communication protocol to communicate with the projectors 104 and 106 through well known methods. The BIOS 116 and 122 can store a model number and identification data for the respective projector 104 and 106. The identification data can include an electronic code (eCode), a service tag number, a piece parts identification (PPID), an SSID, or the like. The identification data can be part of the extended display identification data (EDID) stored in an electronic erasable programmable read only memory (EEPROM) of the BIOS 116 or 122. Thus, the identification data can be sent along with the EDID to the computer 102 from the NICs 114 and 122, so that the computer can identify each of the projectors 104 and 106 and can know the display capabilities of each projector.

The projectors 104 and 106 preferably operate in substantially the same manner. Thus, a description of the operation of the projector 104 can also represent the operation of the projector 106. During the manufacturing process of the projector 104, the identification data including an initial SSID for the projector can be written into the EEPROM of the BIOS 116. The initial SSID for the projector 104 can be the model number of the projector. Thus, if the projector 104 and 106 are both the same model number, the projectors can have the same initial SSID. Therefore, if the projectors 104 and 106 were both located within the communication range of the computer 102 and the initial SSID was broadcast from the projectors, the computer would display two identical SSIDs. As a result, the user would have to randomly guess which of the two SSIDs is associated with the projector 104 to which the user actually wants to connect.

However, when the projector 104 is initialized, the SSID module 112 can retrieve the model number and the identification data from the BIOS 116. The SSID module 112 can then create a unique SSID for the projector 104 by combining the model number and the identification data. For example, the SSID module 112 can combine the model number and the service tag number of the projector 104 together to create a unique SSID for the projector, such as 4610X-ABC104. In this example, the first portion of the SSID, such as 4610X, can be the model number, and the second portion of the SSID, such as ABC104, can be the service tag number. Alternatively, the SSID module 112 can combine the model number with different identification data, such as the eCode, the PPID, or the like so that a different unique SSID is generated by the SSID module.

Upon creating the unique SSID, the SSID module 112 can store the unique SSID in the BIOS 116. The NIC 114 can retrieve the SSID from the BIOD 116, and can then broadcast the SSID to the devices surrounding the projector 104, such as the computer 102. The display module 118 can retrieve the unique SSID from the BIOS 116, and then can output the SSID from the projector 104. The display module 118 can preferably provide the SSID as part of a projector information menu 200 as shown in FIG. 2.

FIG. 2 shows the projector information menu 200 including a model number 202, an eCode 204, a PPID 206, and an SSID 208. The projector information menu 200 is preferably output through a lens of the projector 104, such that the projector information menu can be displayed on a screen, a wall, or any other surface that is suitable for displaying a projection. The user of the computer 102 can utilize the projector information menu 200 to obtain necessary information about the projector that can enable the user to connect the computer to the projector 104.

For example, if the computer 102 has multiple SSIDs listed for projectors that are available for connection with the computer, the user can select the SSID 216 that is listed for the projector 104 on the projector information menu 200. The user can also utilize the projector information menu 200 to view the other identification data for the projector 102 that could be used as a portion of the SSID 208 along with the model number 202, such as the eCode 204 and the PPID 206.

Figure 3:
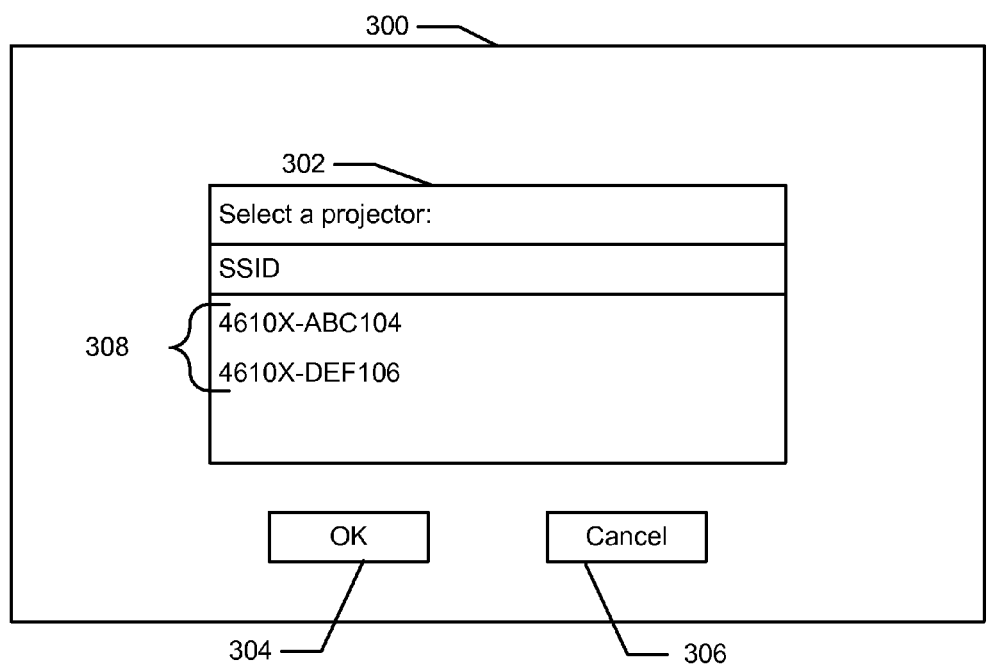
FIG. 3 is an exemplary projector selection menu.

FIG. 3 shows an exemplary screen shot 300 of the computer 102. The screen shot 300 can include a projector selection menu 302, an OK button 304, and a cancel button 306. The projector selection menu 302 can include a list of SSIDs 308 associated with the projectors that are in range of the NIC 110 of the computer 102, such as the projectors 104 and 106. For example, the SSID of the projector 104 can be 4610X-ABC104 and the SSID of projector 106 can be 4610X-ABC106. The user can highlight a particular SSID from the list of SSIDs 308 on the projector selection menu 302 that matches the SSID 216 listed in the projector information menu 200 displayed by the projector that the user wants to connect to the computer 102. For example, if the projector information menu 200 lists the SSID 216 of the projector 104 as 4610X-ABC104, the user can highlight the corresponding SSID from the projector selection menu 302 and select the OK button 304. When the user selects the SSID from the list of SSIDs 308 that corresponds to the projector 104, the computer 102 can utilize the NIC 110 to connect to the NIC 114 of the projector. Thus, the projectors 104 and 106 can create different unique SSIDs so that the user can easily distinguish between the SSIDs and select the SSID that is associated with the desired projector.

Figure 4:
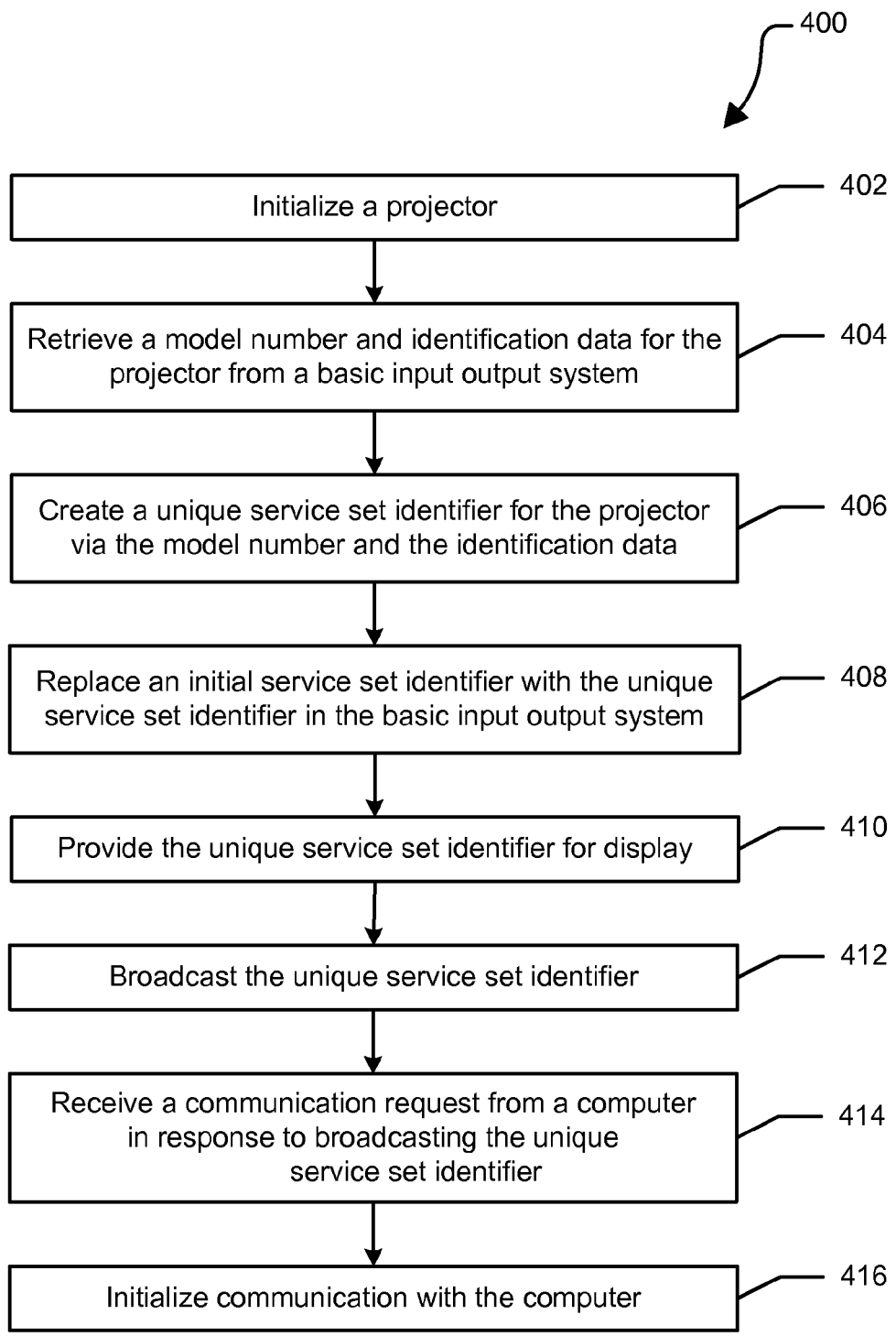
FIG. 4 is a flow diagram of a method for creating a service set identifier for a projector.

FIG. 4 shows a flow diagram of a method 400 for creating a service set identifier for a projector. At block 402, a projector is initialized. The projector can be a wireless projector that communicates using an IEEE 802.11 wireless communication protocol, or any similar wireless communication protocol. A model number and identification data for the projector is retrieved from a basic input output system of the projector at block 404. The identification data can include a service tag number, an eCode, a PPID, or the like. At block 406, a unique SSID is created for the projector via the model number and the identification data.

At block 408, an initial SSID is replaced with the unique SSID in the basic input output system. The unique SSID is provided for display at block 410. At block 412, the unique SSID is broadcast from the projector. The unique SSID is preferably broadcast from the projector via a wireless NIC. A communication request is received from a computer in response to broadcasting the unique SSID at block 414. At block 416, communication is initialized with the computer.

Figure 5:
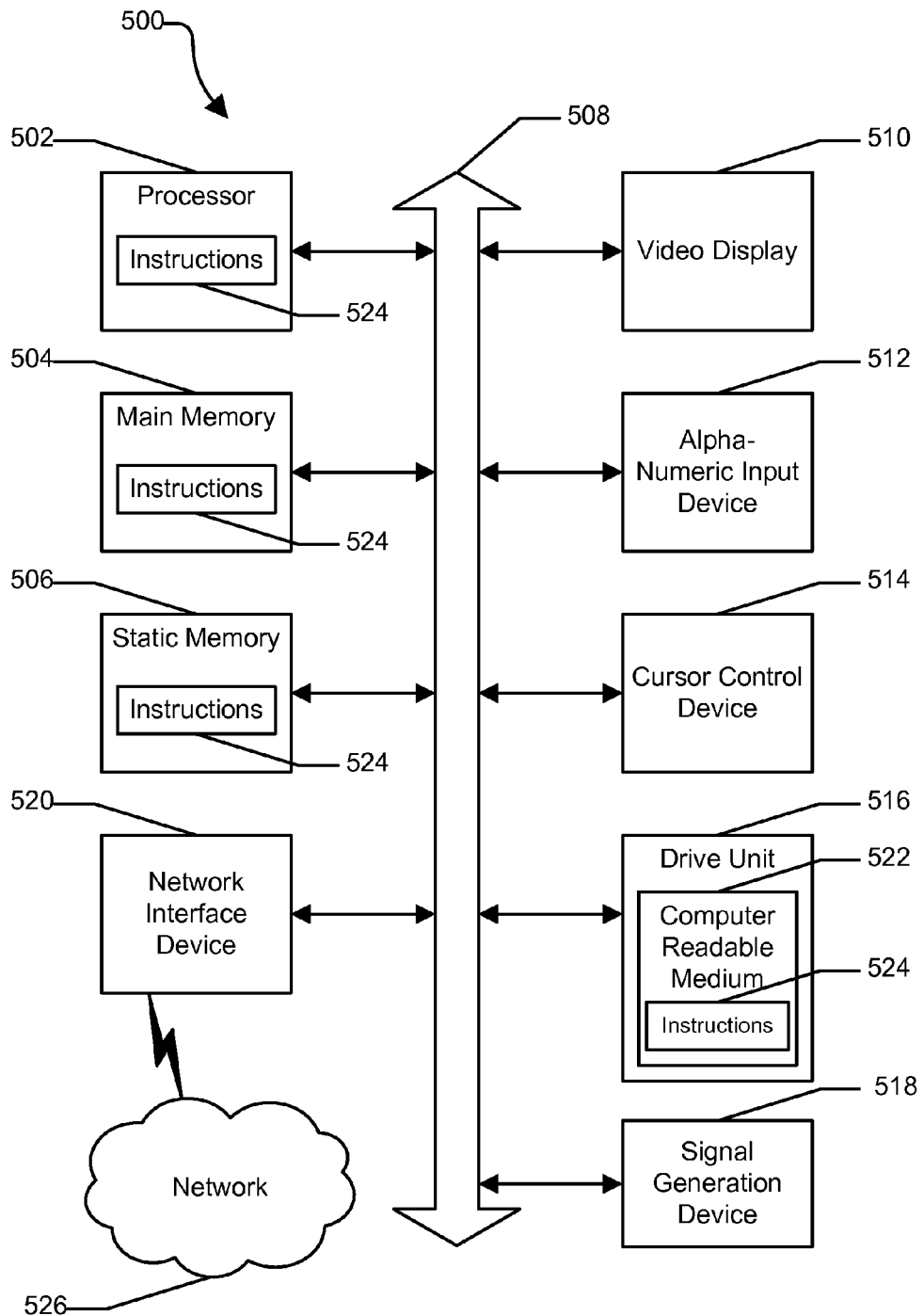
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A projector for projecting an image adapted for display on a computer onto a surface, the projector comprising:
   a network interface card configured to communicate with the computer;
   a basic input output system in communication with the network interface card, the basic input output system configured to store a model number and identification data for the projector located within extended display identification data of the projector, wherein the identification data includes a service tag number of the projector;
   a memory of the basic input output system, the memory to store an initial service set identifier for the projector during a manufacturing process of the projector; and
   a service set identifier module in communication with the basic input output system, the service set identifier module configured to retrieve the model number and the identification data, to utilize the model number and the identification data to create a unique service set identifier for the projector, and to replace the initial service set identifier with the unique service set identifier in the memory, wherein the initial service set identifier is a different value than the unique service set identifier, wherein the unique service set identifier includes a first portion that includes the model number and a second portion that includes the service tag number.

2. The projector of claim 1 further comprising:
   a display module in communication with the service set identifier module, the display module configured to output the unique service set identifier for projection.

3. The projector of claim 1 wherein the network interface card is further configured to wirelessly broadcast the service set identifier.

4. The projector of claim 1 wherein the network interface card is a wireless network interface card.

5. The projector of claim 4 wherein the wireless network interface card is configured to communicate via an IEEE 802.11 wireless protocol.

6. The projector of claim 1 wherein the identification data further includes a piece parts identification.

7. The projector of claim 1 wherein the identification data is located within a read only memory location of the basic input output system.

8. A method comprising:
   initializing a projector;

retrieving a model number and identification data for the projector from a basic input output system, wherein the identification data includes a service tag number of the projector;

creating a unique service set identifier for the projector via the model number and the identification data, wherein the unique service set identifier includes a first portion that includes the model number and a second portion that includes the service tag number;

replacing an initial service set identifier with the unique service set identifier in a memory of the basic input output system, wherein the initial service set identifier is stored in the memory during a first manufacturing process of the projector, and wherein another projector that has a same model number as the projector also has the initial service set identifier stored in the another projector during a second manufacturing process of the another projector, wherein the initial service set identifier is a different value than the unique service set identifier;

providing the service set identifier for display; and broadcasting the unique service set identifier and display capabilities of the projector within extended display identification data of the projector.

9. The method of claim 8 further comprising:

receiving a communication request from a computer in response to broadcasting the unique service set identifier; and initiating communication with the computer.

10. The method of claim 9 wherein the unique service set identifier is broadcast via a wireless network interface card.

11. The method of claim 10 wherein the wireless network interface card is configured to communicate via an IEEE 802.11 wireless protocol.

12. The method of claim 8 wherein the identification data further includes a piece parts identification.

13. The method of claim 8 wherein the identification data is located within extended display identification data.

14. The method of claim 8 wherein the identification data is located within a read only memory location of the basic input output system.

15. A non-transitory computer readable medium comprising a plurality of instructions to manipulate a processor, the plurality of instructions comprising:

instructions to initialize a projector;

instructions to retrieve a model number and identification data for the projector from a basic input output system, wherein the identification data includes a service tag number of the projector;

instructions to create a unique service set identifier for the projector via the model number and the identification data, wherein the unique service set identifier includes a first portion that includes the model number and a second portion that includes the service tag number;

instructions to replace an initial service set identifier with the unique service set identifier in the basic input output system, wherein the initial service set identifier is stored in the projector during a manufacturing process of the projector, and wherein the initial service set identifier is a different value than the unique service set identifier; and instructions to project, from the projector, the unique service set identifier within a projector information menu.

16. The non-transitory computer readable medium of claim 15 further comprising:

instructions to broadcast the unique service set identifier;

instructions to receive a communication request from a computer in response to broadcasting the unique service set identifier; and instructions to initiate communication with the computer.

17. The non-transitory computer readable medium of claim 16 wherein the unique service set identifier is broadcast via a wireless network interface card.

18. The non-transitory computer readable medium of claim 15 wherein the identification data further includes a piece parts identification.

19. The non-transitory computer readable medium of claim 15 wherein the identification data is located within extended display identification data.

* * * * *